United States Patent
Love et al.

(10) Patent No.: US 11,340,815 B2
(45) Date of Patent: May 24, 2022

(54) STORAGE MANAGEMENT SYSTEM AND METHOD

(71) Applicant: EMC IP Holding Company, LLC, Hopkinton, MA (US)

(72) Inventors: Philip Love, San Jose, CA (US); Ronen Gazit, Tel Aviv (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 111 days.

(21) Appl. No.: 16/663,590

(22) Filed: Oct. 25, 2019

(65) Prior Publication Data

US 2021/0124516 A1 Apr. 29, 2021

(51) Int. Cl.
*G06F 3/06* (2006.01)

(52) U.S. Cl.
CPC .......... *G06F 3/0644* (2013.01); *G06F 3/0604* (2013.01); *G06F 3/067* (2013.01); *G06F 3/0653* (2013.01); *G06F 3/0689* (2013.01); *G06F 2211/104* (2013.01)

(58) Field of Classification Search
None
See application file for complete search history.

(56) References Cited

U.S. PATENT DOCUMENTS

| | | | | |
|---|---|---|---|---|
| 6,732,124 | B1 * | 5/2004 | Koseki | G06F 11/1435 |
| 7,383,294 | B1 * | 6/2008 | Tamer | G06F 16/10 |
| | | | | 707/810 |
| 8,463,825 | B1 * | 6/2013 | Harty | G06F 3/0685 |
| | | | | 707/813 |
| 2005/0182910 | A1 * | 8/2005 | Stager | G06F 11/1471 |
| | | | | 711/162 |
| 2012/0265959 | A1 * | 10/2012 | Le | G06F 16/166 |
| | | | | 711/162 |
| 2014/0149698 | A1 * | 5/2014 | Ezra | G06F 12/0864 |
| | | | | 711/162 |

* cited by examiner

*Primary Examiner* — Brian R Peugh
(74) *Attorney, Agent, or Firm* — Brian J. Colandreo; Mark H. Whittenberger; Holland & Knight LLP

(57) ABSTRACT

A method, computer program product, and computing system for remotely storing first content received on a first processing node of a clustered computing environment onto a storage platform, wherein the clustered computing environment includes a plurality of processing nodes; locally storing metadata that identifies the location of the first content within the storage platform on the first processing node, thus defining first locally-stored differential metadata; and after the occurrence of a storage trigger event, instructing the first processing node write the first locally-stored differential metadata to a cluster metadata pool within the storage platform.

20 Claims, 3 Drawing Sheets

STORAGE MANAGEMENT SYSTEM AND METHOD

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to inherent limitations in some of the memory technology utilized in such storage systems, complex methodologies may need to be utilized in order to navigate around such inherent shortcomings.

SUMMARY OF DISCLOSURE

In one implementation, a computer-implemented method is executed on a computing device and includes: remotely storing first content received on a first processing node of a clustered computing environment onto a storage platform, wherein the clustered computing environment includes a plurality of processing nodes; locally storing metadata that identifies the location of the first content within the storage platform on the first processing node, thus defining first locally-stored differential metadata; and after the occurrence of a storage trigger event, instructing the first processing node write the first locally-stored differential metadata to a cluster metadata pool within the storage platform.

One or more of the following features may be included. Second content received on a second processing node of the clustered computing environment may be remotely stored onto the storage platform. Metadata that identifies the location of the second content within the storage platform may be locally stored on the second processing node, thus defining second locally-stored differential metadata. After the occurrence of the storage trigger event, the second processing node may write the second locally-stored differential metadata to the cluster metadata pool within the storage platform. The storage trigger event may include the storage of a defined quantity of locally-stored differential metadata. The storage trigger event may include the passage of a defined period of time. The storage platform may include a backend storage array. The cluster metadata pool may include a flash-based cluster metadata pool. The clustered computing environment may include an active-active clustered computing environment.

In another implementation, a computer program product resides on a computer readable medium and has a plurality of instructions stored on it. When executed by a processor, the instructions cause the processor to perform operations including remotely storing first content received on a first processing node of a clustered computing environment onto a storage platform, wherein the clustered computing environment includes a plurality of processing nodes; locally storing metadata that identifies the location of the first content within the storage platform on the first processing node, thus defining first locally-stored differential metadata; and after the occurrence of a storage trigger event, instructing the first processing node write the first locally-stored differential metadata to a cluster metadata pool within the storage platform.

One or more of the following features may be included. Second content received on a second processing node of the clustered computing environment may be remotely stored onto the storage platform. Metadata that identifies the location of the second content within the storage platform may be locally stored on the second processing node, thus defining second locally-stored differential metadata. After the occurrence of the storage trigger event, the second processing node may write the second locally-stored differential metadata to the cluster metadata pool within the storage platform. The storage trigger event may include the storage of a defined quantity of locally-stored differential metadata. The storage trigger event may include the passage of a defined period of time. The storage platform may include a backend storage array. The cluster metadata pool may include a flash-based cluster metadata pool. The clustered computing environment may include an active-active clustered computing environment.

In another implementation, a computing system includes a processor and memory is configured to perform operations including remotely storing first content received on a first processing node of a clustered computing environment onto a storage platform, wherein the clustered computing environment includes a plurality of processing nodes; locally storing metadata that identifies the location of the first content within the storage platform on the first processing node, thus defining first locally-stored differential metadata; and after the occurrence of a storage trigger event, instructing the first processing node write the first locally-stored differential metadata to a cluster metadata pool within the storage platform.

One or more of the following features may be included. Second content received on a second processing node of the clustered computing environment may be remotely stored onto the storage platform. Metadata that identifies the location of the second content within the storage platform may be locally stored on the second processing node, thus defining second locally-stored differential metadata. After the occurrence of the storage trigger event, the second processing node may write the second locally-stored differential metadata to the cluster metadata pool within the storage platform. The storage trigger event may include the storage of a defined quantity of locally-stored differential metadata. The storage trigger event may include the passage of a defined period of time. The storage platform may include a backend storage array. The cluster metadata pool may include a flash-based cluster metadata pool. The clustered computing environment may include an active-active clustered computing environment.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
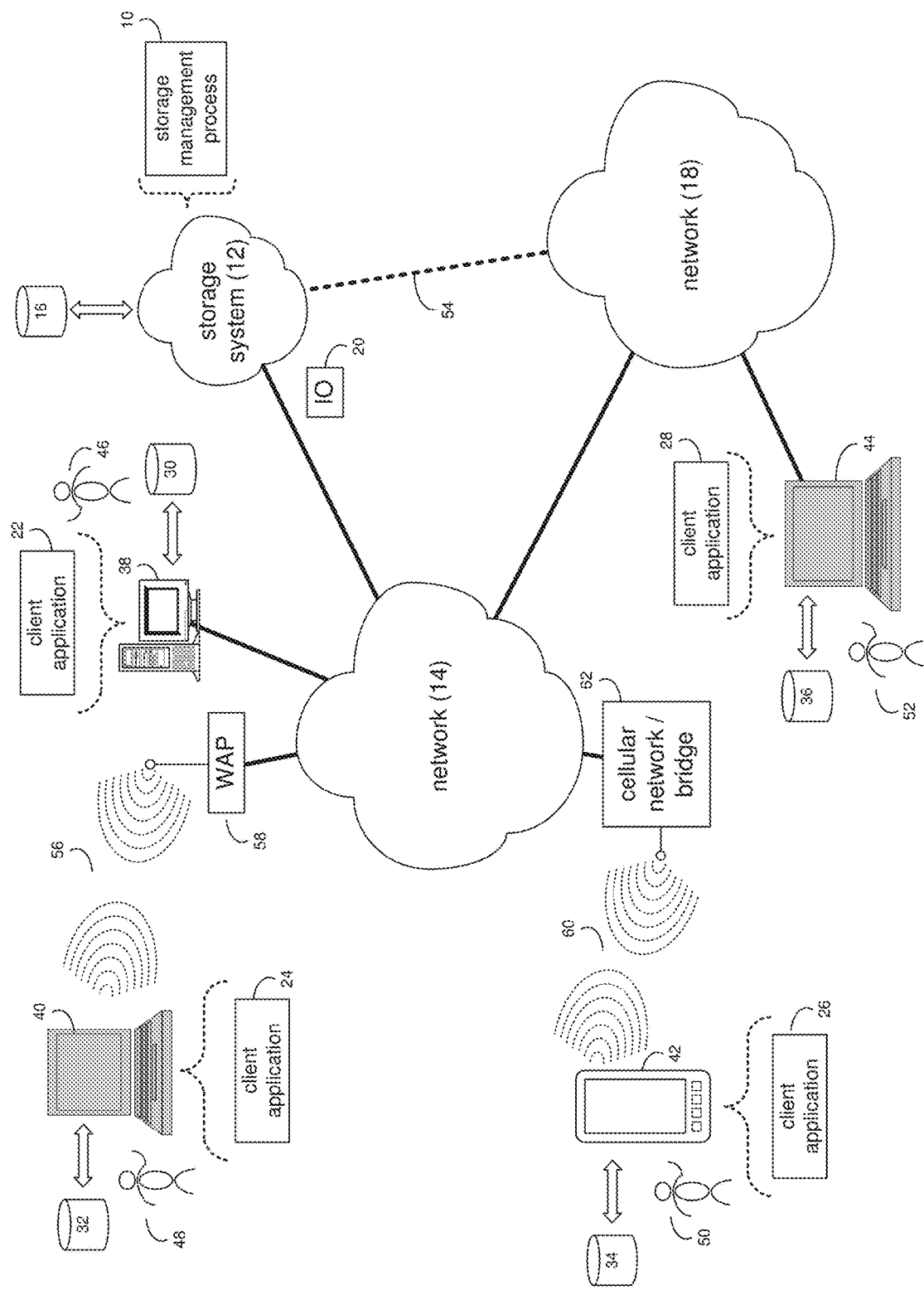
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RANI); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
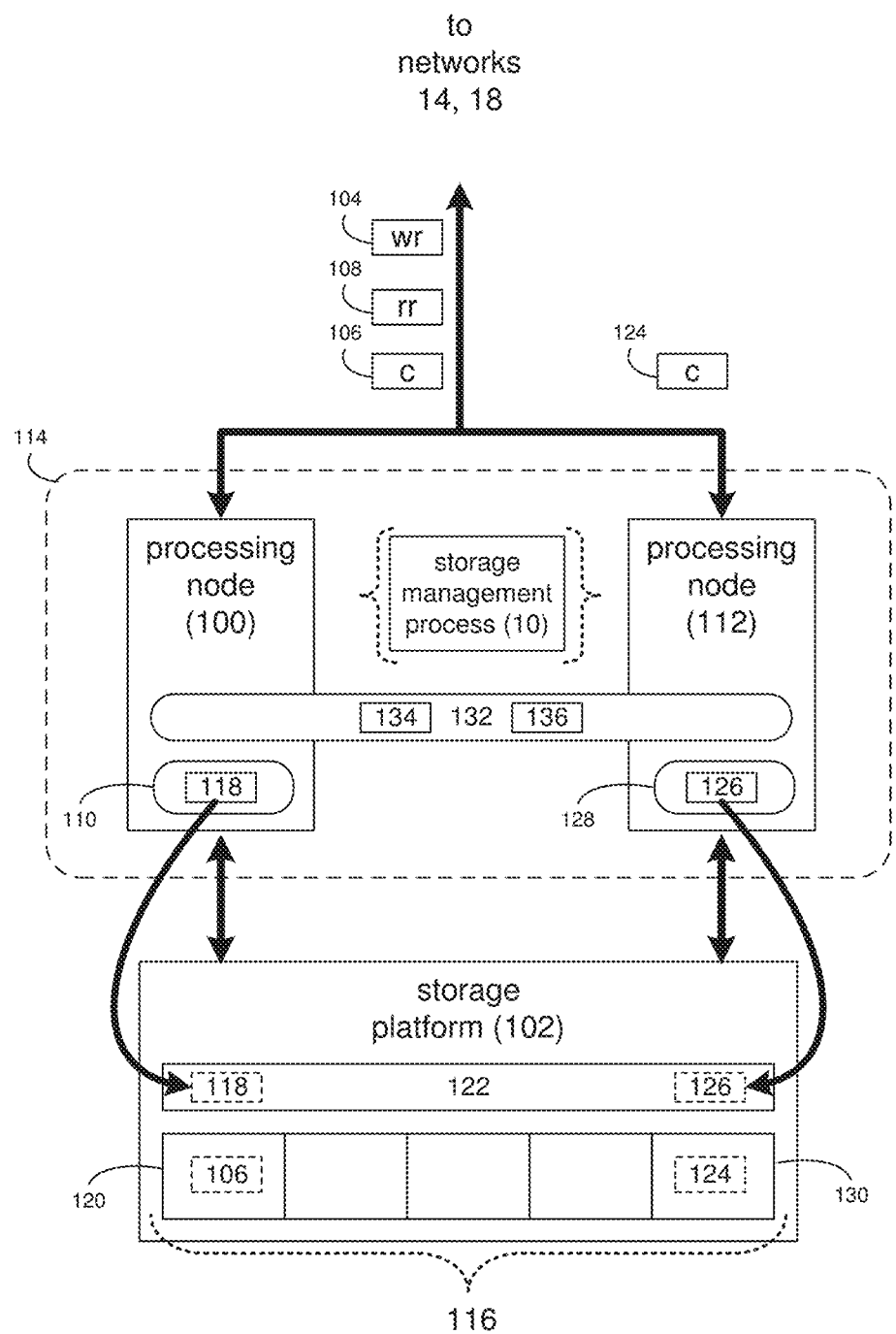
FIG. 2 is a diagrammatic view of the storage system of FIG. 1.

The Data Storage System:

Referring also to FIG. 2, there is shown a general implementation of storage system 12. In this general implementation, storage system 12 may include processing node 100, wherein processing node 100 may be configured to perform computational tasks and may be configured to store data within storage platform 102.

Depending upon the manner in which storage system 12 is configured, storage platform 102 may include a single storage devices (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100. Storage device 16 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100.

Processing node 100 may include cache memory system 110. Examples of cache memory system 110 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 106 within cache memory system 110. Depending upon the manner in which cache memory system 110 is configured, processing node 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 112).

Storage Management Process:

As discussed above, content 106 may be received by (or generated by) a processing node (e.g., processing node 100, 112) for storage within storage system 12.

Figure 3:
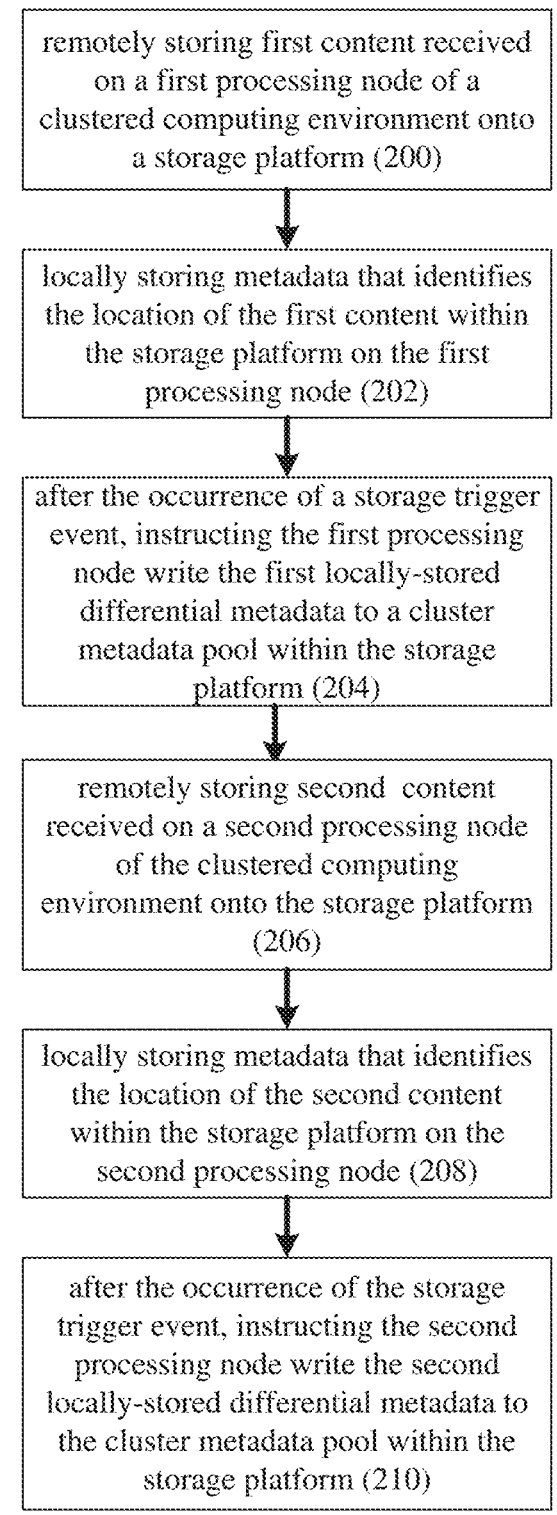
FIG. 3 is a flow chart of the storage management process of FIG. 1.

Referring also to FIG. 3 and upon receiving (or generating) such content, storage management process 10 may remotely store 200 first content (e.g., content 106) received on a first processing node (e.g., processing node 100) of a clustered computing environment (e.g., clustered computing environment 114) onto a storage platform (e.g., storage platform 102). As discussed above, clustered computing environment 114 may include a plurality of processing nodes (e.g., processing node 100, 112). While clustered computing environment 114 in shown to include two processing nodes (e.g., processing nodes 100, 112), this is for illustrative purposes only and is not intended to be a limitation of this disclosure, as other configurations are possible and are considered to be within the scope of this disclosure. For example, it is foreseeable that clustered computing environment 114 may include tens or hundreds of processing nodes.

Examples of clustered computing environment 114 may include an active-active clustered computing environment. As is known in the art, an active-active clustered computing environment may include at least two processing nodes (e.g., processing nodes 100, 112), wherein each of these processing nodes (e.g., processing nodes 100, 112) may be actively running and providing various services simultaneously, thus enabling an active-active clustered computing environment to achieve load balancing and/or provide a high level of availability.

The storage platform (e.g., storage platform 102) may include a backend storage array (e.g., backend storage array 116). As discussed above, storage platform 102 may include a plurality of storage devices (e.g., hard disk drives and/or solid state storage devices), wherein this plurality of storage devices may be configured to form a RAID storage array (e.g., backend storage array 116) utilizing various standard RAID structures (e.g., RAID 0, RAID 1, RAID 3, RAID 5, RAID 6, RAID 7 or RAID 10), thus providing a higher level of performance and/or availability.

As discussed above, storage management process 10 may remotely store 200 content 106 received on processing node 100 of clustered computing environment 114 onto storage platform 12. In order to enable the subsequent retrieval of content 106 from storage platform 102, storage management process 10 may locally store 202 metadata that identifies the location of the first content (e.g., content 106) within the storage platform (e.g., storage platform 102) on the first processing node (e.g., processing node 100), thus defining first locally-stored differential metadata (e.g., metadata 118). The first locally-stored differential metadata (e.g., metadata 118) may be stored within cache memory system 110, wherein cache memory system 110 may include volatile memory (e.g., static random access memory), non-volatile memory (e.g., flash memory) or a combination of volatile and non-volatile memory (e.g., static random access memory for speed and flash memory for high availability).

For example and when remotely storing 200 content 106 onto storage platform 102, content 106 may be stored 200 within a specific data block (e.g., data block 120) included within backend storage array 116 of storage platform 102. Accordingly, metadata 118 locally stored 202 on processing node 100 may define data block 120 as the location of content 106 within backend storage array 116 of storage platform 102. Accordingly and in the event that content 106 needs to be retrieved from backend storage array 116 of storage platform 102 (e.g., data read request 108 requests that content 106 be read from storage system 12), storage management process 10 may utilize first locally-stored differential metadata (e.g., metadata 118) as a pointer to locate and retrieve content 106 from backend storage array 116 of storage platform 102.

Storage platform 102 may include cluster metadata pool 122 that may be configured to centrally store all metadata (e.g., metadata 118) for all processing nodes (e.g., processing nodes 100, 112) included within clustered computing environment 114. An example of cluster metadata pool 122 may include but is not limited to a flash-based cluster metadata pool. As will be discussed below in greater detail, any and all metadata (e.g., metadata 118) locally stored on any of the processing nodes (e.g., processing nodes 100, 112) included within clustered computing environment 114 may eventually be written to (and consolidated within) cluster metadata pool 122.

After the occurrence of a storage trigger event (described below), storage management process 10 may instruct 204 (in this example) the first processing node (e.g., processing node 100) to write the first locally-stored differential metadata (e.g., metadata 118) to cluster metadata pool 122 within storage platform 102. As discussed above, cluster metadata pool 122 may be configured to centrally store all metadata (e.g., metadata 118) for all processing nodes (e.g., processing nodes 100, 112) included within clustered computing environment 114. Accordingly and in the event that any data (e.g., content 106) included within storage platform 102 needs to be retrieved, cluster metadata pool 122 may be accessed so that the appropriate metadata may be obtained to locate the requested data within storage platform 102.

One example of a storage trigger event that may result in processing node 100 writing e.g., metadata 118 to cluster metadata pool 122 may include but is not limited to a defined quantity of locally-stored differential metadata having been stored. For example, a defined number of portions of cache memory system 110 may be dedicated to storing the above-described metadata. Therefore, assume that two one gigabyte portions of cache memory system 110 are dedicated to storing the above-described metadata. Specifically, the first one gigabyte portion of cache memory system 110 may be written to until full and then the second one gigabyte portion of cache memory system 110 may be written to while the metadata in the first one gigabyte portion is stored on cluster metadata pool 122 (thus freeing the first one gigabyte portion of cache memory system 110 for use again). Accordingly, the local storing 202 of (in this example) one gigabyte of metadata may be the storage trigger event that results in storage management process 10 instructing 204 processing node 100 to write metadata 118 to cluster metadata pool 122.

Another example of a storage trigger event that may result in processing node 100 writing e.g., metadata 118 to cluster metadata pool 122 may include but is not limited to the passage of a defined period of time. For example, every 60 seconds, processing node 100 may write metadata 118 to cluster metadata pool 122. Accordingly, the passage of (in this example) 60 seconds may be the storage trigger event that results in storage management process 10 instructing 204 processing node 100 to write metadata 118 to cluster metadata pool 122.

Naturally, the content (e.g., content 106) written to storage platform 102 may be new content (e.g., Content A) or may be revised content (e.g., Content A'). In the event that the content being written to storage platform 102 is revised content (e.g., Content A'), cluster metadata pool 122 may already include an entry that locates out-of-date Content A. Accordingly and in the situation in which the content written is revised content (e.g., Content A'), the portion of cluster metadata pool (e.g., one or more memory pages) that is associated with and locates out-of-date Content A may need to be identified within cluster metadata pool 122 and storage management process 10 may instruct 204 processing node 100 to overwrite the metadata that locates out-of-date Content A with metadata that locates current Content A' within storage platform 102.

As discussed above, storage system 12 may be configured to include a plurality of processing nodes (e.g., processing nodes 100, 112). each of which may be configured to receive, generate and/or process content (e.g., content 106). Accordingly and with respect to processing node 112, assume that processing node 112 receives (or generates) content 124. Storage management process 10 may remotely store 206 second content (e.g., content 124) received on a second processing node (e.g., processing node 112) of the clustered computing environment (e.g., clustered computing environment 114) onto the storage platform (e.g., storage platform 102).

Storage management process 10 may locally store 208 metadata that identifies the location of the second content (e.g., content 124) within the storage platform (e.g., storage platform 102) on the second processing node (e.g., processing node 112), thus defining second locally-stored differential metadata (e.g., metadata 126). The second locally-stored differential metadata (e.g., metadata 126) may be stored within cache memory system 128, wherein cache memory system 128 may include volatile memory (e.g., static random access memory), non-volatile memory (e.g., flash memory) or a combination of volatile and non-volatile memory (e.g., static random access memory for speed and flash memory for high availability).

For example and when remotely storing 206 content 124 onto storage platform 102, content 124 may be stored 206 within a specific data block (e.g., data block 130) included within backend storage array 116 of storage platform 102. Accordingly, metadata 126 locally stored 208 on processing node 112 may define data block 130 as the location of content 124 within backend storage array 116 of storage platform 102. Accordingly and in the event that content 124 needs to be retrieved from backend storage array 116 of storage platform 102 (e.g., data read request 108 requests that content 124 be read from storage system 12), storage management process 10 may utilize second locally-stored differential metadata (e.g., metadata 126) as a pointer to locate and retrieve content 124 from backend storage array 116 of storage platform 102.

As discussed above, after the occurrence of the storage trigger event (e.g., a quantity of locally-stored differential metadata having been stored or the passage of a defined period of time), storage management process 10 may instruct 210 the second processing node (e.g., processing node 112) to write the second locally-stored differential metadata (e.g., metadata 126) to cluster metadata pool 122 within storage platform 102. As discussed above, cluster metadata pool 122 may be configured to centrally store all metadata (e.g., metadata 118, 126) for all processing nodes (e.g., processing nodes 100, 112) included within clustered computing environment 114. Accordingly and in the event that any data (e.g., content 106, 124) included within storage platform 102 needs to be retrieved, cluster metadata pool 122 may be accessed so that the appropriate metadata may be obtained to locate the requested data within storage platform 102.

Assume that prior to a storage trigger event (e.g., a quantity of locally-stored differential metadata having been stored or the passage of a defined period of time):

content 106 received on processing node 100 of clustered computing environment 114 may be remotely stored 200 within data block 120 included within backend storage array 116 of storage platform 102;

metadata 118 may be locally stored 202 on processing node 100 (e.g., within cache memory system 110) and may define data block 120 as the location of content 106 within backend storage array 116 of storage platform 102;

content 124 received on processing node 112 of clustered computing environment 114 may be remotely stored 206 within data block 130 included within backend storage array 116 of storage platform 102; and metadata 126 may be locally stored 208 on processing node 112 (e.g., within cache memory system 128) and may define data block 130 as the location of content 124 within backend storage array 116 of storage platform 102.

As discussed above, after the occurrence of the storage trigger event (e.g., a quantity of locally-stored differential metadata having been stored or the passage of a defined period of time), storage management process 10 may instruct the processing nodes (e.g., processing nodes 100, 112) to write their locally-stored differential metadata (e.g., metadata 118, 126) to cluster metadata pool 122 within storage platform 102.

Storage management process 10 may monitor/keep track of this locally-stored differential metadata on differential metadata buffer 132 (e.g., on a clustered computing environment level that spans all processing nodes). Accordingly, an entry (e.g., entry 134) within differential metadata buffer 132 may indicate that one or more memory pages of cluster metadata pool 122 needs to be updated to define the location of content 106 that was processed and stored by processing node 100. Further, an entry (e.g., entry 136) within differential metadata buffer 132 may indicate that one or more memory pages of cluster metadata pool 122 needs to be updated to define the location of content 124 that was processed and stored by processing node 112.

Accordingly and after the occurrence of the storage trigger event (e.g., a quantity of locally-stored differential metadata having been stored or the passage of a defined period of time), storage management process 10 may process differential metadata buffer 132 to determine what portions of cluster metadata pool 122 need to be updated. Through the use of differential metadata buffer 132, storage management process 10 may determine that:

one or more memory pages of cluster metadata pool 122 needs to be updated to define the location of content 106 that was processed and stored by processing node 100; and one or more memory pages of cluster metadata pool 122 needs to be updated to define the location of content 124 that was processed and stored by processing node 112.

Accordingly, storage management process 10 may instruct 204 the first processing node (e.g., processing node 100) to write the first locally-stored differential metadata (e.g., metadata 118) to cluster metadata pool 122 within storage platform 102. In the event that the first locally-stored differential metadata (e.g., metadata 118) in no longer available from cache memory system 110 due to e.g., the cache being overwritten, storage management process 10 may need to obtain an older version of metadata 118 from cluster metadata pool 122 so that this older version of metadata 118 may be updated to locate the appropriate content (e.g., content 106). In the event that content 106 was a variant of earlier stored content (e.g., current Content A' versus out-of-date Content A), the portion of cluster metadata pool 122 associated with out-of-date Content A may be overwritten with metadata that points to the location of current Content A').

Further, storage management process 10 may instruct 210 the second processing node (e.g., processing node 112) to write the second locally-stored differential metadata (e.g., metadata 126) to cluster metadata pool 122 within storage platform 102. In the event that the second locally-stored differential metadata (e.g., metadata 126) in no longer available from cache memory system 128 due to e.g., the cache being overwritten, storage management process 10 may need to obtain an older version of metadata 126 from cluster metadata pool 122 so that this older version of metadata 126 may be updated to locate the appropriate content (e.g., content 124). In the event that content 124 was a variant of earlier stored content (e.g., current Content B' versus out-of-date Content B), the portion of cluster metadata pool 122 associated with out-of-date Content B may be overwritten with metadata that points to the location of current Content B').

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    remotely storing first content received on a first processing node of a clustered computing environment onto a storage platform, wherein the clustered computing environment includes a plurality of processing nodes;
    locally storing metadata that identifies the location of the first content within the storage platform on the first processing node, thus defining first locally-stored differential metadata stored within a dedicated portion of a cache memory system;
    initiating a storage trigger event of a plurality of potential storage trigger events in response to storing at least a threshold amount of locally-stored differential metadata stored within the dedicated portion of the cache memory system; and
    after the occurrence of the storage trigger event, instructing the first processing node to write the first locally-stored differential metadata to a cluster metadata pool within the storage platform.

2. The computer-implemented method of claim 1 further comprising:
    remotely storing second content received on a second processing node of the clustered computing environment onto the storage platform;
    locally storing metadata that identifies the location of the second content within the storage platform on the second processing node, thus defining second locally-stored differential metadata; and
    after the occurrence of the storage trigger event, instructing the second processing node write the second locally-stored differential metadata to the cluster metadata pool within the storage platform.

3. The computer-implemented method of claim 2, wherein one or more of the first content and the second content include revised content, wherein the revised content is associated with content previously stored on storage platform.

4. The computer-implemented method of claim 3, further comprising:
    identifying a portion of the cluster metadata pool that is associated with the previously stored content; and
    overwriting the portion of the cluster metadata pool associated with previously stored content with metadata that is configured to locate the revised content within the storage platform.

5. The computer-implemented method of claim 1 wherein the plurality of potential storage trigger events include a storage trigger event in response to the passage of a defined period of time.

6. The computer-implemented method of claim 1 wherein the storage platform includes a backend storage array.

7. The computer-implemented method of claim 1 wherein the cluster metadata pool includes a flash-based cluster metadata pool.

8. The computer-implemented method of claim 1 wherein the clustered computing environment includes an active-active clustered computing environment.

9. A computer program product residing on a non-transitory computer readable medium having a plurality of instructions stored thereon which, when executed by a processor, cause the processor to perform operations comprising:
    remotely storing first content received on a first processing node of a clustered computing environment onto a storage platform, wherein the clustered computing environment includes a plurality of processing nodes;
    locally storing metadata that identifies the location of the first content within the storage platform on the first processing node, thus defining first locally-stored differential metadata stored within a dedicated portion of a cache memory system;
    initiating a storage trigger event of a plurality of potential storage trigger events in response to storing at least a threshold amount of locally-stored differential metadata stored within the dedicated portion of the cache memory system; and after the occurrence of the storage trigger event, instructing the first processing node to write the first locally-stored differential metadata to a cluster metadata pool within the storage platform.

10. The computer program product of claim 9 further comprising:
remotely storing second content received on a second processing node of the clustered computing environment onto the storage platform;
locally storing metadata that identifies the location of the second content within the storage platform on the second processing node, thus defining second locally-stored differential metadata; and
after the occurrence of the storage trigger event, instructing the second processing node write the second locally-stored differential metadata to the cluster metadata pool within the storage platform.

11. The computer program product of claim 9 wherein the plurality of potential storage trigger events include a storage trigger event in response to the passage of a defined period of time.

12. The computer program product of claim 9 wherein the storage platform includes a backend storage array.

13. The computer program product of claim 9 wherein the cluster metadata pool includes a flash-based cluster metadata pool.

14. The computer program product of claim 9 wherein the clustered computing environment includes an active-active clustered computing environment.

15. A computing system including a processor and memory configured to perform operations comprising:
remotely storing first content received on a first processing node of a clustered computing environment onto a storage platform, wherein the clustered computing environment includes a plurality of processing nodes;
locally storing metadata that identifies the location of the first content within the storage platform on the first processing node, thus defining first locally-stored differential metadata stored within a dedicated portion of a cache memory system;
initiating a storage trigger event of a plurality of potential storage trigger events in response to storing at least a threshold amount of locally-stored differential metadata stored within the dedicated portion of the cache memory system; and
after the occurrence of the storage trigger event, instructing the first processing node to write the first locally-stored differential metadata to a cluster metadata pool within the storage platform.

16. The computing system of claim 15 further comprising:
remotely storing second content received on a second processing node of the clustered computing environment onto the storage platform;
locally storing metadata that identifies the location of the second content within the storage platform on the second processing node, thus defining second locally-stored differential metadata; and
after the occurrence of the storage trigger event, instructing the second processing node write the second locally-stored differential metadata to the cluster metadata pool within the storage platform.

17. The computing system of claim 15 wherein the plurality of potential storage trigger events include a storage trigger event in response to the passage of a defined period of time.

18. The computing system of claim 15 wherein the storage platform includes a backend storage array.

19. The computing system of claim 15 wherein the cluster metadata pool includes a flash-based cluster metadata pool.

20. The computing system of claim 15 wherein the clustered computing environment includes an active-active clustered computing environment.

* * * * *